Nov. 15, 1938.   W. F. BOLDT ET AL   2,136,410
BRAKE CONTROL MECHANISM
Filed July 26, 1937   3 Sheets-Sheet 1

INVENTORS
W. F. BOLDT
W. R. FREEMAN
BY
ATTORNEY.

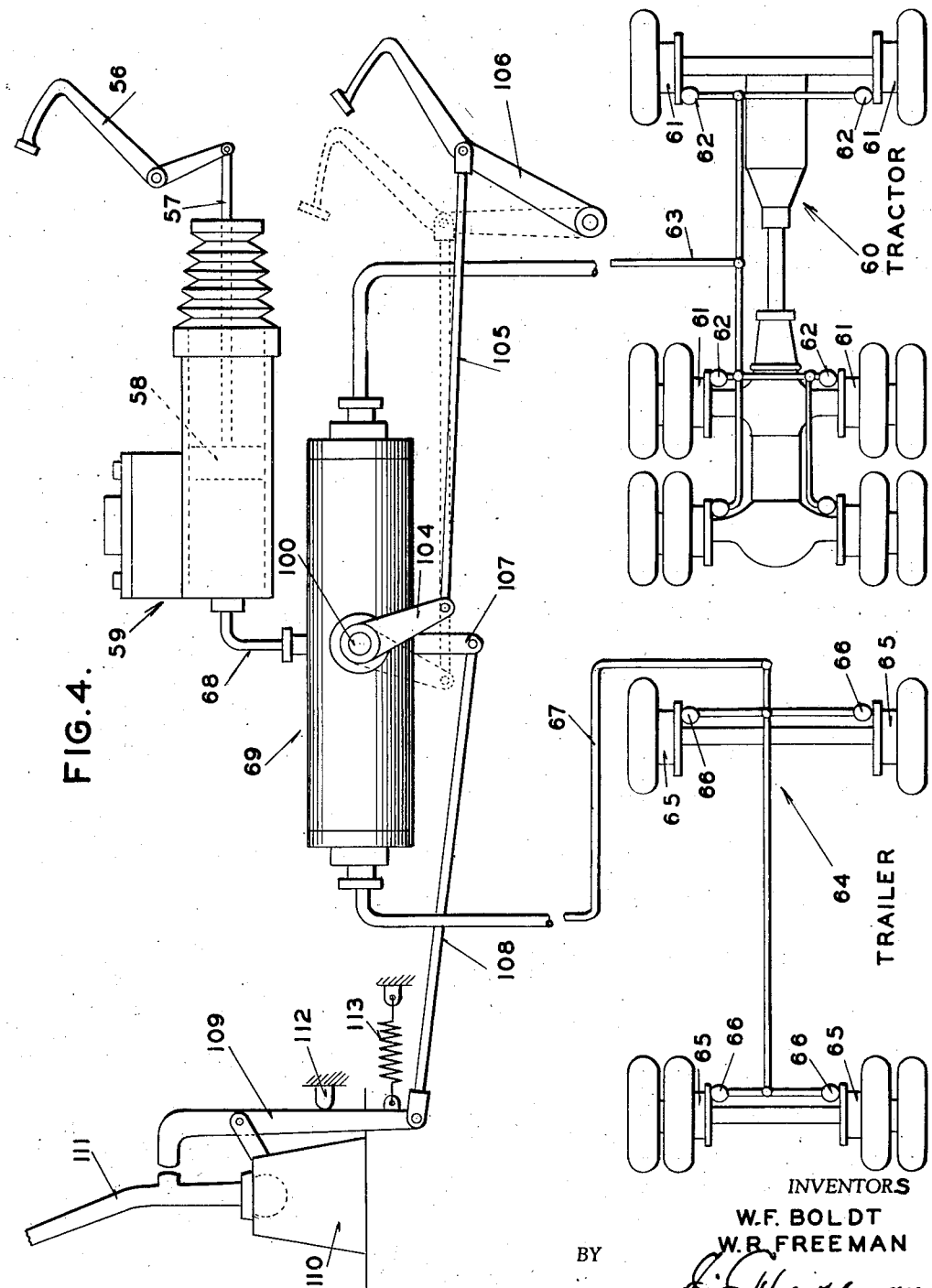

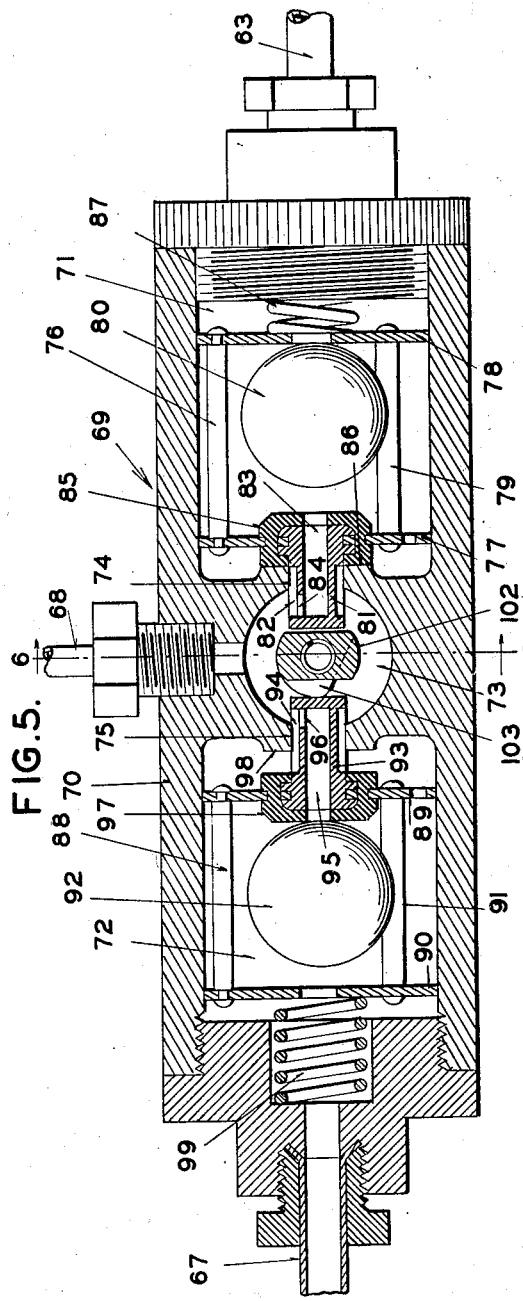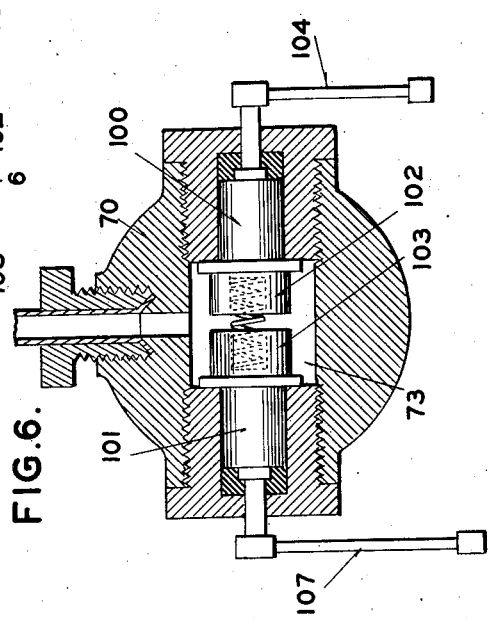

Patented Nov. 15, 1938

2,136,410

UNITED STATES PATENT OFFICE 2,136,410

BRAKE CONTROL MECHANISM

Werner F. Boldt, Overland, and Walter R. Freeman, University City, Mo., assignors to Wagner Electric Corporation, St. Louis, Mo., a corporation of Delaware Application July 26, 1937, Serial No. 155,638

20 Claims. (Cl. 192—4)

Our invention relates to improvements in means for preventing release of the brakes of a vehicle or vehicles from applied position under certain conditions.

One of the objects of our invention is to provide a braking mechanism for a vehicle or vehicles with means for holding certain of the wheel brakes of the braking mechanism applied under certain conditions and for holding other of the wheel brakes applied under other conditions.

A more specific object is to provide a braking mechanism for a vehicle or vehicles with means which, when the power clutch is disengaged, will prevent release of the rear wheel brakes on a single vehicle or the wheel brakes on the rear vehicle of a plurality of vehicles when the vehicle or vehicles are facing downwardly on an inclined roadway and the change speed gearing is set in reverse, and also prevent release of the brakes on the front wheels of a single vehicle or the wheel brakes on the front vehicle of a plurality of vehicles when the vehicle or vehicles are facing upwardly on an inclined roadway and the change speed gearing is set in another position.

Figure 1:
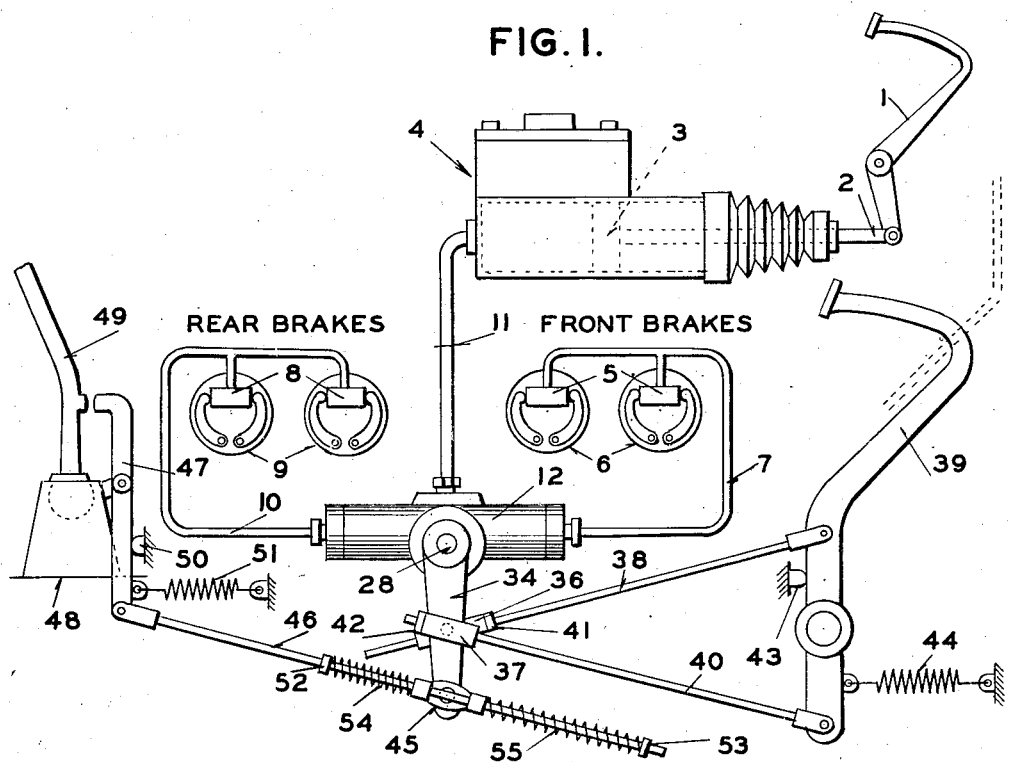
Figure 2:
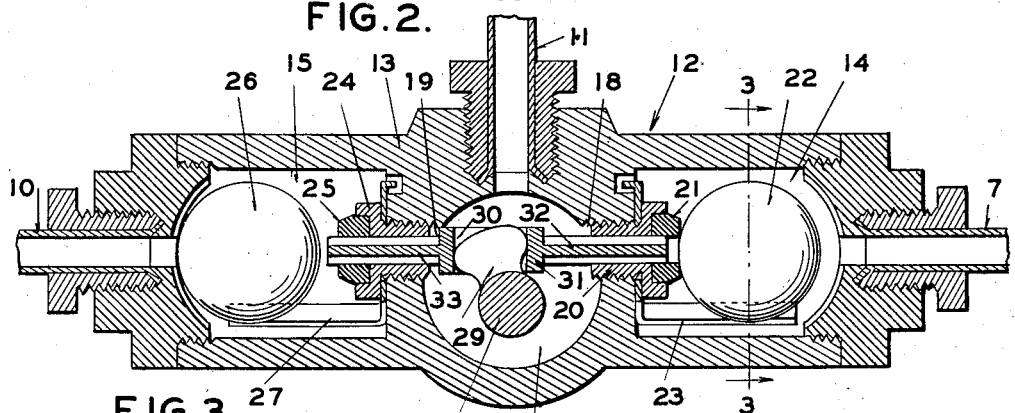
Figure 3:
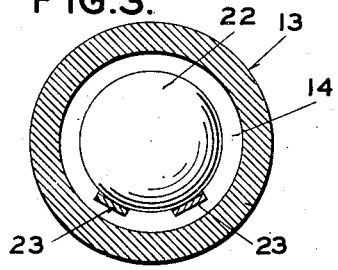

Other objects will become apparent from the following description taken in connection with the accompanying drawings in which Figure 1 is a schematic view of a portion of the fluid brake mechanism, the clutch mechanism, and the change speed gearing of a vehicle, showing our invention associated therewith; Figure 2 is a longitudinal cross-sectional view of the control valve mechanism for the brake mechanism; Figure 3 is a cross-sectional view taken on the line 3—3 of Figure 2; Figure 4 is a schematic view similar to Figure 1 showing our invention embodied in a fluid braking mechanism for a tractor-trailer vehicle; Figure 5 is a longitudinal cross-sectional view of a modified control valve mechanism employed in Figure 4; and Figure 6 is a cross-sectional view taken on the line 6—6 of Figure 5.

Referring to Figures 1, 2, and 3, there is shown a hydraulic braking system comprising a brake pedal 1 connected by a rod 2 to actuate the piston 3 of a well-known master cylinder device 4. The fluid motors 5 for the front brake assemblies 6 are connected to a supply conduit 7 and the fluid motors 8 for the rear brake assemblies 9 are connected to a supply conduit 10. The single conduit 11 leading from the master cylinder is connected to the supply conduits 7 and 10 through our novel control valve mechanism 12 whereby fluid under pressure, when transmitted to fluid motors 5 and 8, may be maintained therein under certain conditions to thus hold the brakes in applied position.

The control valve mechanism is shown in detail in Figures 2 and 3 and comprises a casing 13 having a chamber 14 in one end, a chamber 15 in the other end, and a central chamber 17. The chamber 14 is connected with conduit 7 leading to the front brakes; the chamber 15 is connected with conduit 10 leading to the rear brakes; and chamber 17 is connected to conduit 11 leading from the master cylinder. The central chamber 17 communicates with chamber 14 by a passage 18 and with chamber 15 by a passage 19.

The passage 18 has threaded therein a tubular plug 20 carrying a rubber valve seat 21 positioned in chamber 14 and cooperating with this seat is a ball 22 free to roll on a track 23 (Figure 3) mounted in the chamber by means of plug 20. Similarly, passage 19 has threaded therein a tubular plug 24 carrying a rubber valve seat 25 positioned in chamber 15 and cooperating with this seat is a ball 26 free to roll on a track 27 mounted in the chamber by means of plug 24. The central chamber 17 has journaled therein a cross shaft 28 carrying an arm 29 which projects into a central slot 30 in a rod 31. This rod is formed with fluted end portions 32 and 33 which project into the tubular plugs 20 and 24, respectively. The grooves forming the fluted portions are of such depth as to permit passage of fluid through the plugs and rod 31 is of such over-all length that when arm 29 is in the vertical position the ends of the rod will hold both balls 22 and 26 off their seats and permit fluid to pass in either direction between the central chamber and the end chambers. Either ball may be permitted to seat by moving rod 31 in a direction to place the end adjacent the ball back of the valve seat.

The valve mechanism just described is adapted to be controlled by both the clutch mechanism and the change speed gearing. Referring again to Figure 1, the exterior end of shaft 28 has secured thereto an arm 34 and mounted thereon are pivoted sleeves 36 and 37. A rod 38 extends through sleeve 36 and is connected to the usual clutch pedal 39 above its pivot point and a second rod 40 extends through sleeve 37 and is connected to the clutch pedal below its pivot point. The rod 38 is provided with a collar 41 for engaging the forward end of sleeve 36 and rod 40 is provided with a collar 42 for engaging the rear end of sleeve 37 when the clutch pedal is in a position wherein the clutch is engaged as shown in Figure 1. Thus it is seen that by means of this construction when the clutch pedal is depressed to disengage the clutch, arm 34 is free to be swung in either direction but when the clutch pedal is in a position to permit the clutch to engage, the arm will always be brought back to its central position as shown in Figure 1. The clutch pedal is biased to clutch-engaged position against a stop 46 by a spring 44.

The lower end of arm 34 is also provided with a pivoted sleeve 45 and extending through this sleeve is a rod 46 which is connected to the lower end of a lever 47 pivoted to the gear shifting lever dome of the change speed gearing 48. The upper end of lever 47 is adapted to be positioned in the path of the gear shift lever 49 when this lever is moved forwardly to place the gearing in reverse speed as is the usual practice. The lever is held in its normal position against a stop 50 by a spring 51 and when in this position, it will not be affected by the gear shift lever when it is moved to place the gearing in forward speed gear position or in neutral position. The rod 46 is provided with collars 52 and 53 on opposite sides of sleeve 45 and between these collars and the sleeve are springs 54 and 55. The collars are so positioned on the rod that spring 54 will be compressed when arm 34 is in its central position as determined by the clutch pedal when in clutch-engaging position. When the clutch is disengaged, springs 54 and 55 will become balanced and arm 34 will be swung forwardly. When the gear shift lever is moved to reverse gear position, lever will be moved and spring 55 will become compressed. Under these conditions if the clutch pedal is depressed, the springs will become balanced and swing arm 34 rearwardly.

Referring to the operation of the above described mechanism, the valve casing 12 is so mounted on the vehicle that the tracks 20 and 27 are parallel with the vehicle roadway, that is, horizontal when the vehicle is on a level roadway. When the clutch pedal is in clutch-engaging position and the gearing is in either neutral position or any one of the forward gear positions, the parts will be in the positions shown in Figure 1. If the vehicle is stopped facing upwardly on an inclined roadway and the clutch is disengaged, arm 34 will be swung forwardly under the action of spring 54 and, as a result thereof, rod 31 connected to the lever will be moved to the left as shown in Figure 2. Due to the longitudinal inclination of the vehicle, ball 22 will now roll against seat 21. If the brakes have been applied, they will be held applied on the front wheel brake asemblies only since ball 22 will prevent fluid from returning to the master cylinder. The rear brakes will be free to be released by the brake pedal as ball 26 will roll to the left end of chamber 15 due to the inclination of its track and also be prevented from seating due to the position of end 33 of the rod. If the brakes have not been applied, they all may be applied by manipulation of the brake pedal as the fluid under pressure will unseat ball 22 and permit fluid to be transmitted to the front brake assemblies. It is thus seen that the front brakes only can be maintained applied without holding the operator's foot on the brake pedal when the clutch pedal is depressed, thereby leaving him free to use his right foot for other purposes, as for example, the starter pedal or the accelerator pedal preparatory to starting the vehicle. When the clutch pedal is released, arm 34 will again be brought to its center position as shown in Figure 1 and ball 22 will be forced off its seat by end 32 of rod 31. The front brakes will then be released and the vehicle free to be started up the incline. The parts are so proportioned that the brakes will be released at the time or slightly before the clutch engages. From the foregoing it is apparent that the vehicle can be held by the front brakes from rolling backward on an incline when the gearing is in either neutral or forward gear position by merely holding the clutch pedal in clutch-disengaging position.

When the vehicle is stopped facing downwardly on an inclined roadway and it is desired to back the vehicle up the incline, the rear brakes can also be held applied without holding the operator's foot on the brake pedal, thus leaving him free to manipulate other pedals, as for example, the accelerator pedal. Under these conditions the gear shift lever is placed in reverse gear position and, as a result thereof, lever 47 is moved in a clockwise direction. This causes spring 55 to be compressed and spring 54 to be released. With the clutch pedal depressed, spring 55 will swing arm 34 to the left and thus move rod 31 to the right of its center position. Due to the inclination of the vehicle, ball 26 will seat and ball 22 will be either forced away or roll away from its seat. With the brakes applied the rear brakes will be held applied due to the seating of ball 26. The brakes will be released by the release of the clutch pedal in a manner already described.

By the use of the brake control mechanism just described the vehicle can be prevented from rolling on an incline in a direction opposite to that for which the change speed gearing is set which is the desired condition as there is no difficulty in starting a vehicle which is free to roll on an inclined roadway in a direction corresponding to the gear setting.

It is also to be noted that by the use of the rolling balls to determine when the control valve mechanism will be effective to hold the brakes applied there will be no tendency of the brakes being held applied when the vehicle is moving. Thus if the clutch is disengaged when the brakes are applied during the time the vehicle is moving forward along a highway, ball 22 will not become seated although the end 32 of the rod is withdrawn since the action of inertia during deceleration of the vehicle will hold the ball at the right end of chamber 14. The end 33 of the rod under these conditions will hold ball 26 off its seat.

Referring to Figures 4, 5, and 6, we have shown our invention embodied in a hydraulic braking system for a tractor-trailer vehicle. There is also shown in this embodiment a slightly modified form of control valve. The hydraulic braking system comprises a brake pedal 56 connected by rod 57 to piston 58 of the master cylinder device 59. The tractor 60 is provided with brake assemblies 61, the shoes of which are actuated by the fluid motors 62, all of which are interconnected by suitable conduits connected to the supply conduit 63. The trailer 64 is also provided with wheel brake assemblies 65, the shoes of which are actuated by the fluid motor 66, all of which are interconnected by suitable conduits connected to the single supply conduit 67. A single conduit 68 leading from the master cylinder is connected to supply conduits 63 and 67 through the control valve mechanism 69 whereby fluid under pressure, when transmitted to fluid motors 62 and 66, may be maintained therein under certain conditions to thus hold the brakes of either the tractor or the trailer in applied position.

Referring to Figures 5 and 6, the control valve mechanism comprises a casing 70 having a chamber 71 at one end, a chamber 72 at the other end, and a central chamber 73. The chamber 71 is connected to conduit 63 leading to the tractor brakes; chamber 72 is connected to conduit 67 leading to the trailer brakes; and the central chamber 73 is connected to conduit 68 leading from the master cylinder. The chamber 73 is connected with chamber 71 by a passageway 74 and with chamber 72 by a passageway 75. The chamber 71 has positioned therein a cage 76 formed of end plates 77 and 78 connected together by rods 79, the lower two of which (one only being shown) form a track upon which is positioned a ball 80. The plate 77 carries a tubular projection 81 which projects through passage 74 and into central chamber 73. The outer surface of this projection is provided with grooves 82 and the passage 83 in the tubular member is in constant communication with the central chamber 73 by holes 84. The plate 77 and the tubular member carry a rubber member 85, one surface of which is adapted to engage the surface 86 surrounding the passageway 74 and these surfaces are normally biased in tight engagement by a spring 87 acting upon end plate 78 of the cage. The rubber member 85 also acts as a valve seat for the rolling ball 80 and when this ball is in engagement with the rubber member, it will close off passageway 83 through the tubular member.

The chamber 72 has positioned therein a cage 88 formed of end plates 89 and 90 connected together by rods 91, the lower two of which (one only being shown) form a track upon which is positioned a ball 92. The plate 89 carries a tubular projection 93 which projects through passageway 75 and into the central chamber 73. The outer surface of this projection is provided with grooves 94, and passage 95 in the tubular member is in constant communication with the central chamber 73 by holes 96. The plate 89 and the tubular member carry a rubber member 97, one surface of which is adapted to engage the surface 98 surrounding passageway 75 and these surfaces are normally biased in tight engagement by a spring 99 acting upon end plate 90 of the cage. The rubber member 97 also acts as a valve seat for rolling ball 92 and when this ball is in engagement with the rubber member, it will close off passageway 95 through the tubular member.

Referring to Figure 6, there is journaled in the casing 70 two aligned shafts 100 and 101, the inner ends of which project into the central chamber 73. The shaft 100 is provided with a rectangular-shaped cam 102 and shaft 101 is provided with a triangular-shaped cam 103, both of which are adapted to cooperate with the ends of the tubular members 81 and 93. The outer end of shaft 100 carries an arm 104 which is connected by a link 105 to clutch pedal 106. The exterior end of shaft 101 is also provided with an arm 107 connected by a link 108 with a lever 109 pivotally mounted upon the change speed gearing casing 110 of the tractor. The upper end of lever 109 is adapted to lie in the path of movement of the gear shift lever 111 when it is moved forwardly from a neutral position to place the change speed gearing in reverse gear. The lever 109 is held in its normal position against a stop 112 by a spring 113.

Referring to the operation of the mechanism shown in Figures 4, 5, and 6, the valve casing 70 is mounted on the tractor so that rods 79 and rods 91 forming the tracks for balls 80 and 92 will be parallel with the vehicle roadway. When the clutch pedal 106 is in clutch-engaged position (dotted lines in Figure 4), the rectangular cam 102 will be in a position where its major axis is in substantial alignment with the axes of the cages, thus maintaining the valve cage 76 at the right end of chamber 71 and valve cage 88 at the left end of chamber 72. When the gearing is in either neutral position or in any one of the forward gear positions, lever 109 will be in the position shown in Figure 4 and the triangular cam 103 which is controlled by this lever will be in the position shown in Figure 5 wherein it will be capable of maintaining cage 88 at the left end of chamber 72 as shown in Figure 5.

If the tractor-trailer vehicle is stopped facing upwardly on an inclined roadway and the clutch is disengaged (shown in full lines in Figure 4), arm 104 will be swung forwardly to place the rectangular cam 102 in the position shown in Figure 5. The cage 76 will be free to be moved to the left end of chamber 71 by the action of spring 87 and the rubber member 85 will now seat against surface 86 and close off any possibility of passage of fluid through grooves 82 in the tubular member 81. Since the tractor is inclined upwardly, ball 80 will roll against the rubber member and also close off passage 83 through the tubular member. If the change speed gearing is either in a forward gear position or in neutral position when the vehicle is stopped, cage 88 will be in the position shown in Figure 5. The ball 92 will roll away from rubber member 97 and thus fluid will be free to flow to and from the tractor brakes by way of either grooves 94 or the central passage 95 in the tubular member. If the brakes have been applied by actuation of the brake pedal, they will be held applied on the tractor only since ball 80 will prevent return flow of fluid to the master cylinder from the fluid motors 62. If the brakes have not been applied, they can easily be applied by operating the master cylinder since ball 80 will unseat to permit fluid to flow from the master cylinder to the fluid motors of the tractor brakes. The brake pedal may now be released and the trailer brakes will be released therewith but the tractor brakes will be maintained applied. The holding effect of the tractor brakes only is sufficient to prevent the tractor and trailer from rolling down the incline and since it is not necessary for the operator to hold his foot on the brake pedal, he is free to employ it for other purposes, as for example, operating the accelerator pedal for starting the vehicle or the starter pedal to start the engine in the event it has become dead. When it is desired to start the vehicle up the inclined roadway, the release of the clutch pedal preparatory to starting the tractor will result in the rectangular cam being moved to its horizontal position, thus moving cage 76 to the right hand of chamber 71. This will cause the rubber member 85 to move away from surface 86 and the fluid in fluid motor 62 of the tractor brakes will be free to flow through grooves 82 in tubular member 81 and back into the master cylinder to thereby release the tractor brakes.

When the tractor is stopped facing downwardly on an inclined roadway and it is desired to back the tractor and trailer up the incline, the trailer brakes can also be held applied without the operator holding his foot on the brake pedal. Under these conditions the gear shift lever is placed in reverse gear position, thereby swinging lever 107 rearwardly. This will cause the triangular cam 103 to become disengaged from tubular member 93 and engage the tubular member 81 to force cage 76 to the right where the rubber member 95 and ball 90 cannot be effective to hold the tractor brakes applied under any conditions. With the clutch disengaged, cage 88 will be moved to the right end of chamber 72 under the action of spring 99 and the rubber member 97 will seat against surface 98. Due to the inclination of the vehicle, ball 92 will now be in engagement with the rubber member 97 and fluid will be prevented from flowing from the fluid motors 66 of the trailer back to the master cylinder. If the brakes have been applied, they will be held applied on the trailer only. If the brakes have not been applied, they may be applied by actuating the brake pedal, ball 92 unseating to permit fluid under pressure to be forced out of the master cylinder into the fluid motors of the trailer. When it is desired to start the vehicle up the inclined roadway, the clutch will be engaged, thus causing the rectangular cam to assume its horizontal position, thereby moving cage 88 to the left and releasing the trailer brakes.

It is thus seen from the above description that when the valve control mechanism is employed on a tractor and trailer vehicle, the brakes on the tractor only can be held applied when the vehicle is stopped facing upwardly on an incline and that the brakes on the trailer only can be held applied when the vehicle is facing downwardly on an inclined roadway.

Being aware of the possibility of modifications in the particular structure herein described without departing from the fundamental principles of our invention, we do not intend that its scope be limited except as set forth by the appended claims.

Having fully described our invention, what we claim as new and desire to secure by Letters Patent of the United States is:

1. In a vehicle, a braking mechanism having a plurality of braking units and means for normally controlling the application and release thereof, additional means for holding a braking unit in applied position when the vehicle is facing upward on an inclined roadway and for holding another of the braking units in applied position when the vehicle is facing downward on an inclined roadway.

2. In a vehicle provided with a plurality of vehicle braking units and means for normally controlling the application and release of the brakes, means other than said normal control means for holding a brake unit in applied position and other means for holding another brake unit in applied position, and means under control of the vehicle operator determining which of said holding means shall be operative.

3. In a vehicle equipped with front and rear brakes and means for normally controlling the application and release thereof, means for holding the front brakes in applied position under pre-selected conditions, and means for holding the rear brakes in applied position under other pre-selected conditions.

4. In a vehicle provided with a member for controlling the application of driving power to the vehicle wheels and with a plurality of vehicle braking units and means for normally controlling the application and release of the brakes, means other than said normal control means for holding a braking unit in applied position and other means for holding another braking unit in applied position, means under control of the vehicle operator determining which of said holding means shall be operative, and means for causing both of said holding means to be ineffective when the member is operated to cause driving power to be applied to the wheels of the vehicles.

5. In apparatus of the class described, a braking mechanism having a plurality of braking units and means for normally controlling the application and release thereof, a change speed gearing, and means other than the normal control means for holding certain of the braking units applied when the gearing is set in one position and for holding other of the braking units applied when the gearing is set in another position.

6. In apparatus of the class described, a braking mechanism having a plurality of braking units and means for normally controlling the application and release thereof, a change speed gearing, means other than the normal control means for holding certain of the braking units applied when the gearing is set in one position and for holding other of the braking units applied when the gearing is set in another position, and manually operable means for causing both of said holding means to be ineffective.

7. In a motor vehicle, a braking mechanism having a plurality of braking units and means for normally applying and releasing the same, means other than the normal means for holding certain of the braking units applied, additional means for holding other of the braking units applied, manually operable means for selectively causing one or the other of said holding means to be operable, and other manually operable means for causing both of said holding means to be ineffective.

8. In a motor vehicle provided with a member for controlling the application of driving power to the vehicle wheels and with a braking mechanism having a plurality of braking units and means for normally applying and releasing the same, a change speed gearing, means other than the normal means for holding certain of the braking units applied when the gearing is set in reverse gear position, additional means for holding other of the braking units applied when the gearing is set in another position, and means for causing both of said holding means to be ineffective when the member is operated to cause driving power to be applied to the wheels of the vehicle.

9. In a motor vehicle provided with front wheel brakes and rear wheel brakes and means for applying the same and with a change speed gearing, means for holding the rear wheel brakes applied when the gearing is set in reverse gear position, means for holding the front wheel brakes applied when the gearing is set in another position, and means for causing both of said holding means to be ineffective at the will of the vehicle operator.

10. In a motor vehicle provided with a member for controlling the application of driving power to the vehicle wheels and with front wheel brakes and rear wheel brakes and means for applying the same and with a change speed gearing, means for holding the rear wheel brakes applied when the gearing is set in reverse gear position and the vehicle is facing downwardly on an inclined roadway, means for holding the front wheel brakes applied when the gearing is set in another position and the vehicle is facing upwardly on an inclined roadway, and means for causing both of said holding means to be ineffective when the member is operated to cause driving power to be applied to the wheels of the vehicle.

11. In a motor vehicle provided with a change speed gearing and with two sets of brakes and means for applying the same, a gravity-controlled means associated with each set of brakes for holding the brakes thereof in applied position, and means controlled by the setting of the change speed gearing to cause the gravity-controlled means of one or the other of the sets of brakes to be effective to hold said set of brakes applied and prevent the vehicle from moving by its own weight on an inclined roadway and in a direction opposite that for which the change speed gearing is set.

12. In a motor vehicle provided with a change speed gearing, with a clutch mechanism and with two sets of brakes and means for applying the same, a gravity-controlled means associated with each set of brakes for holding the brakes thereof in applied position, and means controlled by the setting of the change speed gearing to cause the gravity-controlled means of one or the other of the sets of brakes to be effective to hold said set of brakes applied and prevent the vehicle from moving by its own weight on an inclined roadway and in a direction opposite that for which the change speed gearing is set.

13. In a motor vehicle, two sets of fluid-actuated braking units, a source of fluid pressure, a conduit connecting each set of braking units with the source of pressure, gravity and inertia controlled valve means associated with each conduit for preventing return flow of fluid from each set of braking units, a change speed gearing, means operable when the change speed gearing is set in reverse gear position for causing one of said valve means to be operable when the vehicle is stopped and facing downwardly on an inclined roadway, means operable when the gearing is set in another position for causing the other valve means to be operable when the vehicle is stopped and facing upwardly on an inclined roadway, a clutch mechanism, and means operating when the clutch mechanism is in engaged position for causing said valve means to be ineffective.

14. In a combined tractor and trailer vehicle, a set of brakes for the tractor, a set of brakes for the trailer, common means for applying the brakes on both the tractor and trailer, means for holding the tractor brakes applied, means for holding the trailer brakes applied, and means for determining which of said holding means is to be effective.

15. In a combined tractor and trailer vehicle, a clutch mechanism for the tractor, a set of brakes for the tractor, a set of brakes for the trailer, common means for applying the brakes on both the tractor and the trailer, means for holding the tractor brakes applied, means for holding the trailer brakes applied, means for selectively causing one or the other of said holding means to be effective, and means operable when the clutch mechanism of the tractor is in engaged position for causing both of said holding means to be ineffective.

16. In a combined tractor and trailer vehicle, a clutch mechanism for the tractor, a change speed gearing for the tractor, a set of brakes for the tractor, a set of brakes for the trailer, common means for applying the brakes on both the tractor and trailer, means for holding the brakes on the trailer applied when the tractor and trailer are stopped facing downwardly on an inclined roadway and the change speed gearing is set in reverse gear position, means for holding the brakes on the tractor applied when the tractor and trailer are stopped facing upwardly on an inclined roadway and the change speed gearing is set in another position, and means operable by the clutch mechanism when in clutch-engaged position for causing both of said holding means to be ineffective.

17. In a motor vehicle, two sets of fluid-actuated braking units, a source of fluid pressure, a conduit connecting each set of braking units with the source of pressure, valve means in each conduit for preventing return flow of fluid from each set of braking units, each of said valve means comprising a valve seat and a rolling ball cooperating therewith and subject to the action of gravity and to the action of inertia during change in speed of the vehicle, a change speed gearing, a clutch mechanism, means operating when the clutch mechanism is in clutch-engaged position for causing both of said balls to be ineffective to prevent return flow of fluid, and means controlled by the gearing when in reverse speed and the clutch mechanism is disengaged for permitting one of the balls to be effective to prevent return flow of fluid when the vehicle is facing downwardly on an inclined roadway and when in another gear position and the clutch is disengaged for permitting the other of the ball to be effective to prevent return flow of fluid when the vehicle is facing upwardly on an inclined roadway.

18. In a motor vehicle, two sets of fluid-actuated braking units, a source of fluid pressure, a conduit connecting each set of braking units with the source of pressure, valve means in each conduit for preventing return flow of fluid from each set of braking units, each of said valve means comprising a valve seat and a rolling ball cooperating therewith and subject to the action of gravity and to the action of inertia during change in speed of the vehicle, a change speed gearing, a clutch mechanism, a movable member for selectively permitting either of said balls to be effective to prevent return flow of fluid or both of said balls to be ineffective, means operating when the clutch is in engaged position for placing said member in a position to cause both of said balls to be ineffective, and means operating when the clutch is in disengaged position and the gearing is in reverse for causing said movable member to assume a position where one of said balls is effective to prevent return flow of fluid and when the clutch mechanism is in disengaged position and the gearing is in another position for causing said movable member to assume a position where the other of said balls is effective to prevent return flow of fluid.

19. In a motor vehicle, two sets of fluid-actuated braking units, a source of fluid pressure, a conduit connecting each set of braking units with the source of pressure, valve means in each conduit for preventing return flow of fluid from each set of braking units, each of said valve means comprising a valve seat and a rolling ball cooperating therewith and subject to the action of gravity and inertia during change in speed of the vehicle, a change speed gearing, a clutch mechanism, a movable member for selectively permitting either of said balls to be effective to prevent return flow of fluid or both of said balls to be ineffective, a shaft for moving said member, an arm on said shaft, means controlled by the gearing when in reverse gear for moving said arm to a position where said movable member will permit one of said balls to be effective to prevent return flow of fluid and when in another gear position for moving said arm to a position where said movable member will permit the other of said balls to be effective, and means operating when the clutch is engaged for moving said arm to a position where said movable member will cause both of said balls to be ineffective.

20. In a motor vehicle, two sets of fluid-actuated braking units, a source of pressure, a conduit connecting each set of braking units with the source of pressure, valve means in each conduit for preventing return flow of fluid from each set of braking units, each of said valve means comprising a valve seat, a movable cage having a track, a ball mounted on the track and subject to the action of gravity and inertia during change in speed of the vehicle and an annular member carried by the end of the cage for cooperating with the valve seat and the ball, a change speed gearing, means comprising a cam member controlled by the change speed gearing when in reverse gear for moving one of the cages to a position where its annular member will be free of the valve seat and when in another gear position for moving the other cage to a position where its annular member will be free of the valve seat, a clutch mechanism, and means comprising a cam for causing both of said cages to be moved to a position where said annular members are free of their valve seats when the clutch is in engaged position.

WERNER F. BOLDT.
WALTER R. FREEMAN.